US009825789B1

(12) United States Patent
Patel et al.

(10) Patent No.: US 9,825,789 B1
(45) Date of Patent: Nov. 21, 2017

(54) METHOD AND APPARATUS FOR A MULTI-USER SPATIAL MULTIPLEXING DECODER

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 224 days.

(21) Appl. No.: 14/806,873

(22) Filed: Jul. 23, 2015

(51) Int. Cl.
| H04L 27/00 | (2006.01) |
| H04W 72/04 | (2009.01) |
| H04B 7/04 | (2017.01) |
| H04L 1/00 | (2006.01) |
| H04L 27/26 | (2006.01) |
| H04B 7/0413 | (2017.01) |

(52) U.S. Cl.
CPC ....... *H04L 27/0012* (2013.01); *H04B 7/0413* (2013.01); *H04L 1/0003* (2013.01); *H04W 72/044* (2013.01); *H04L 27/2601* (2013.01)

(58) Field of Classification Search
None
See application file for complete search history.

(56) References Cited

U.S. PATENT DOCUMENTS

| 2008/0222498 | A1* | 9/2008 | Shieh | H03M 13/3905 |
| | | | | 714/791 |
| 2010/0091912 | A1* | 4/2010 | Park | H04L 25/03171 |
| | | | | 375/341 |
| 2011/0261906 | A1* | 10/2011 | Chuang | H04L 27/0012 |
| | | | | 375/340 |
| 2015/0155971 | A1* | 6/2015 | Dvoretzki | H04L 1/0054 |
| | | | | 375/341 |
| 2015/0222457 | A1* | 8/2015 | Kaplan | H04B 7/02 |
| | | | | 375/341 |
| 2016/0044640 | A1* | 2/2016 | Reial | H04B 1/7105 |
| | | | | 370/342 |
| 2016/0112220 | A1* | 4/2016 | Paker | H04L 25/03242 |
| | | | | 375/232 |

\* cited by examiner

*Primary Examiner* — Yaotang Wang
(74) *Attorney, Agent, or Firm* — Lerner, David, Littenberg, Krumholz & Mentlik, LLP (57) ABSTRACT

Spatial Multiplexing (SM) with Multiple Input Multiple Output (MIMO) is used in many wireless communication systems for providing high data rate in a given channel bandwidth. When SM-MIMO is used for sharing the same resources for multiple users (MU-SM), the control information describing the parameters of MU-SM need to be sent separately to all the users that may be sharing the same resources. The base station in a wireless communication system may only provide the parameters required by each specific client terminal for decoding the data addressed to it. A method and apparatus are disclosed that enable improved decoding of MU-SM signals in scenarios where information about the parameters of other transmissions on the same resources or absence of any transmission other than the one intended for the subject client terminal is not available.

21 Claims, 13 Drawing Sheets

FIG. 1

(Prior Art)

FIG. 2

(Prior Art)

• 64-QAM constellation point      ○ 64-QAM constellation point

□ QPSK constellation point        ⊠ All-zero constellation point

METHOD AND APPARATUS FOR A MULTI-USER SPATIAL MULTIPLEXING DECODER

BACKGROUND

Figure 1:
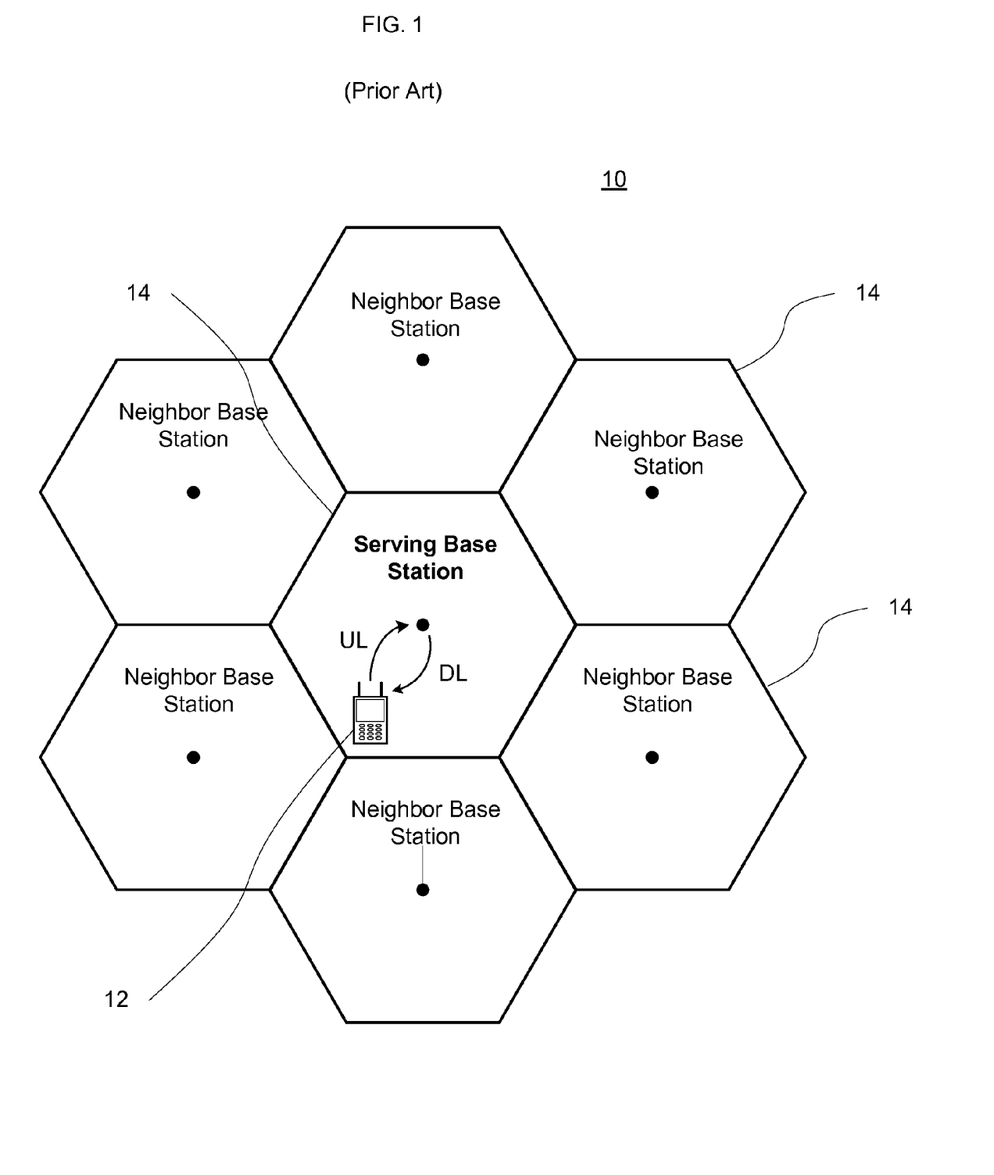
FIG. 1 illustrates a conventional wireless cellular communication system.

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred as a neighbor cell.

Multiple transmit and/or receive chains are commonly used in many wireless communication systems for different purposes. Using multiple transmit and/or receive chains the spatial dimension can be exploited in the design of a wireless communication system. Wireless communication systems with multiple transmit and/or receive chains offer improved performance. The performance improvement can be in terms of better coverage, higher data rates, reduced Signal to Noise Ratio (SNR) requirements, multiplexing of multiple users on the same channel at the same time, or some combination of the above. Different techniques using multiple transmit and/or receive chains are often referred to with different terms such as Maximal Ratio Combining (MRC), Space-Time Coding (STC) or Space-Time Block Coding (STBC), Spatial Multiplexing (SM), Beam-Forming (BF) and Multiple Input Multiple Output (MIMO). Wireless communication systems with multiple transmit chains at the transmit entity and multiple receive chains at the receive entity are generically referred as MIMO systems.

In an SM-MIMO system a high data rate stream is split into multiple lower date rate streams and each lower data rate stream is transmitted from a different transmit antenna on the same frequency at the same time. Alternatively, data from two different users or applications may be transmitted from different transmit antennas on the same frequency at the same time. If signals from different transmit antennas arrive at the receiver antennas through sufficiently different spatial propagation paths, the receiver may be able to separate these streams of data, creating parallel spatial channels on the same frequency at the same time. SM is a powerful technique for increasing channel capacity at higher SNR. The maximum number of spatially multiplexed data streams is limited by the minimum of the number of antennas at the transmit entity and the number of antennas at the receive entity and the degree of spatial isolation between the antennas at the receive entity and transmit entity. For example if the number of transmit antennas at the transmit entity is four and the number of receive antennas at the receive entity is two, the maximum number of spatially separable data streams is two.

Figure 2:
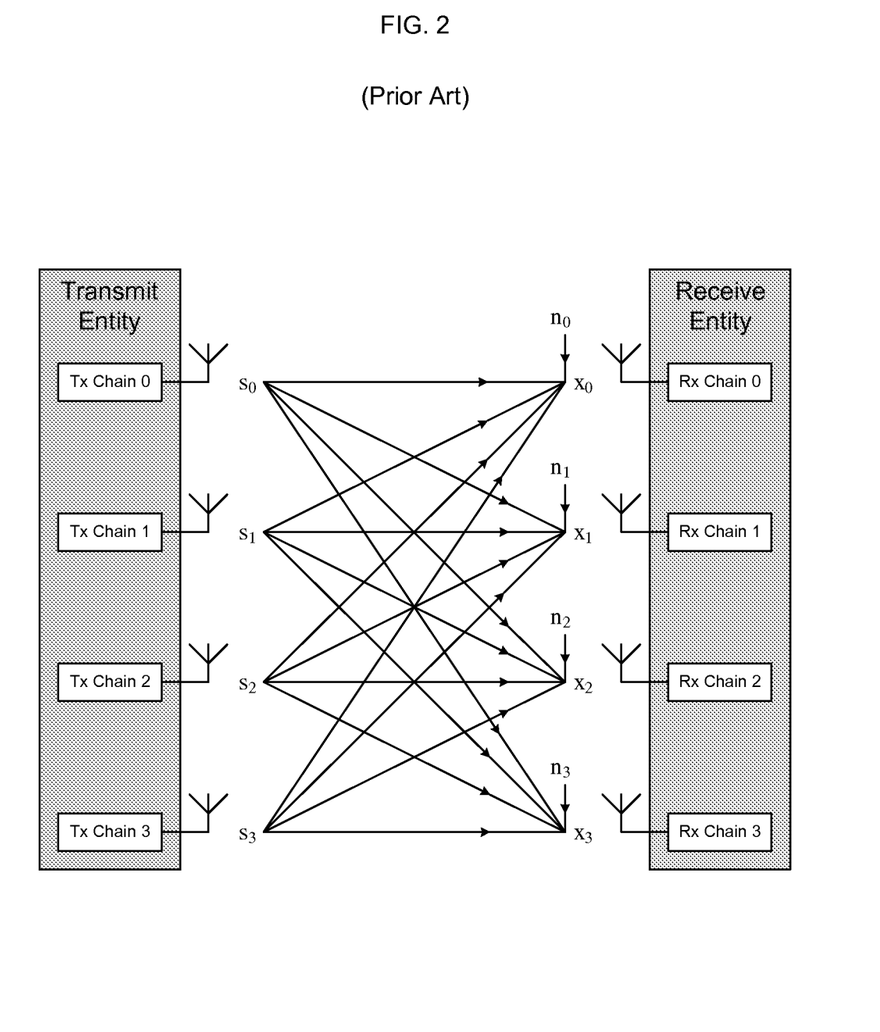
FIG. 2 illustrates a 4×4 MIMO wireless communication system.

FIG. 2 illustrates an example of an SM-MIMO wireless communication system with four transmit chains at the transmit entity, for example a base station, and four receive chains at the receive entity, for example a client terminal. The signal from a transmit chain arrives at all four receive chains through different propagation paths as shown in FIG. 2. The receive signal at each receive chains may be a combination of signals transmitted from all four transmit chains and the noise as shown in FIG. 2.

Figure 3:
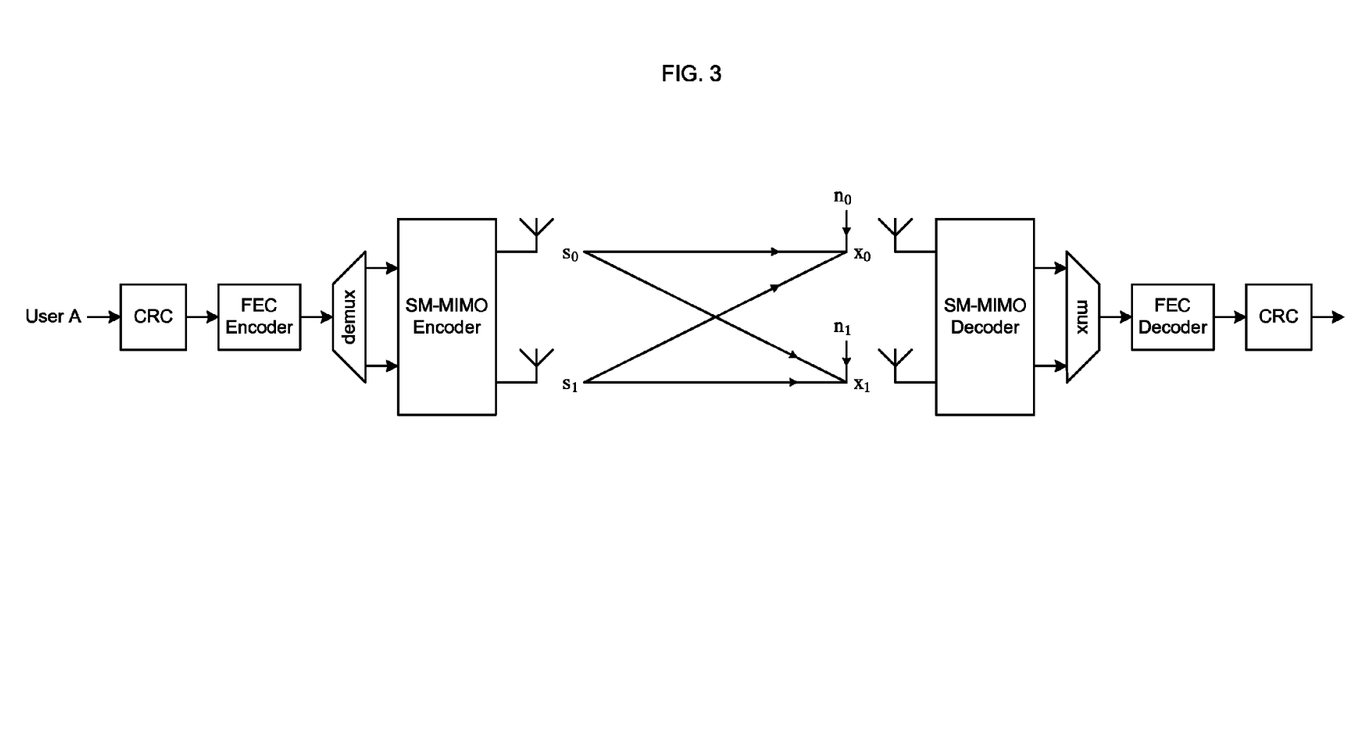
FIG. 3 illustrates a 2×2 SM-MIMO wireless communication system with single stream of data for a single user with two layer spatial multiplexing.
Figure 4:
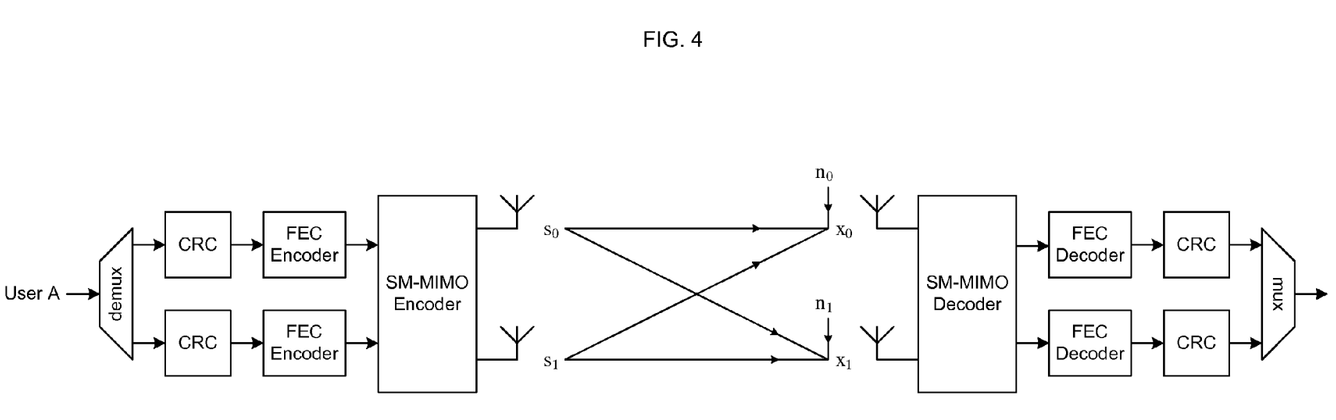
FIG. 4 illustrates a 2×2 SM-MIMO wireless communication system with two streams of data for a single user with two layer spatial multiplexing.
Figure 5:
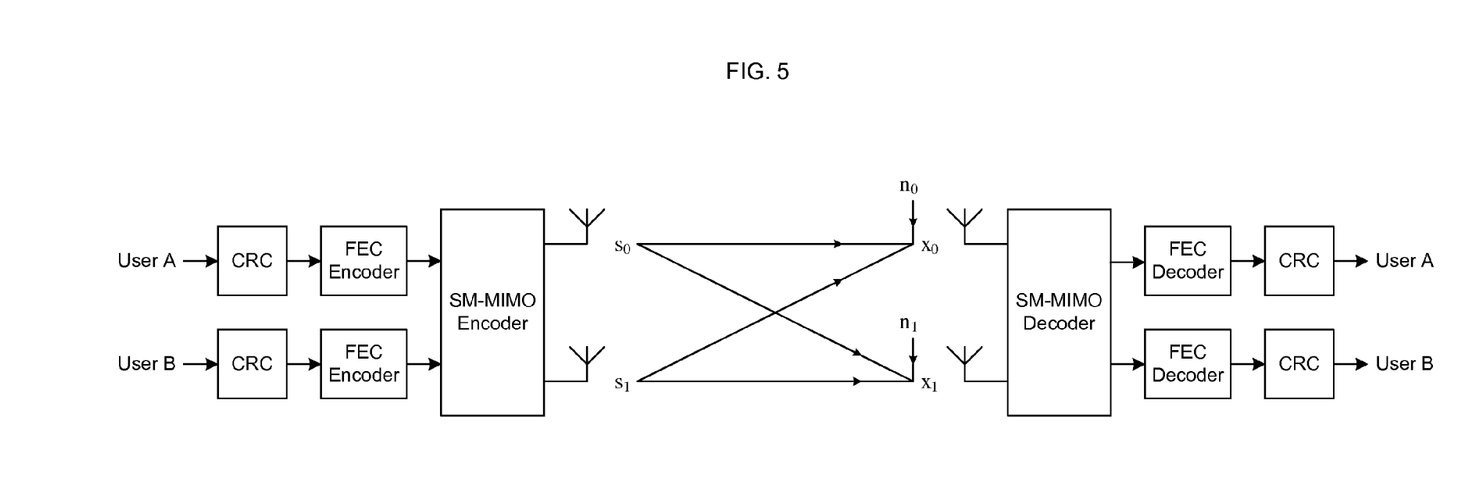
FIG. 5 illustrates a 2×2 SM-MIMO wireless communication system with two streams of data for two different users with two layer spatial multiplexing.

SM-MIMO can be used in different configurations. Three different example configurations are shown in FIG. 3, FIG. 4, and FIG. 5. In the SM-MIMO configuration in FIG. 3 a single stream of data goes through the Cyclic Redundancy check (CRC) and Forward Error Correction (FEC) processing and then it is de-multiplexed into two streams for mapping to the two layers of the SM-MIMO transmission system. The SM-MIMO configuration in FIG. 4 is a multi-codeword MIMO system. In this configuration, the information from a single stream of data is first de-multiplexed into two streams and then the CRC and FEC are performed separately before mapping the two streams to the two layers of the SM-MIMO system. This method allows for independent decoding of the two streams of data and also allows for the Successive Interference Cancellation (SIC) type of receiver for improved performance. The SM-MIMO configuration in FIG. 5 is essentially the same as the configuration in FIG. 4 except that the two streams of data originate from two different users. This enables the ability to multiplex multiple users on the same resources at the same time and therefore it is often referred to as Multi-User SM (MU-SM). The SM-MIMO configurations in FIG. 3 and FIG. 4 are often referred to as Single User SM (SU-SM). In MU-SM mode, a single stream of data is transmitted for each user whereas in the SU-SM mode there are two streams of data transmitted to a single user.

Figure 6:
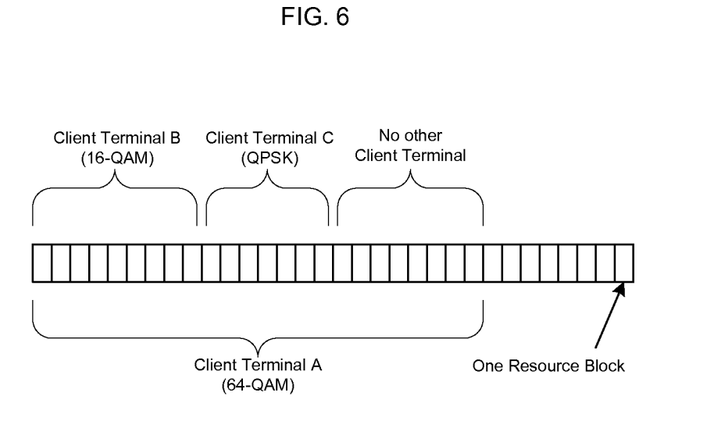
FIG. 6 illustrates the dynamic scheduling of multiple users on the same resources in MU-MIMO mode.

In the $3^{rd}$ Generation Partnership Project (3GPP) Long Term Evolution (LTE) wireless communication system, different MIMO modes for transmission are defined. One such mode is the MU-MIMO where two users may be multiplexed on a single resource at the same time. The SM decoder for the MU-SM can be very similar to SM decoder for the SU-SM configurations shown in FIG. 3 and FIG. 4 if the information about the Modulation and Coding Scheme (MCS) is known for both the users. However, in 3GPP LTE wireless communication system, in order to reduce the overhead of control information in case of MU-SM, each individual client terminal multiplexed on to the same resource is aware of the MCS for the SM layer to which data for it are mapped. The client terminal may not be aware of the MCS used for transmission to other client terminals on the same resources. This method is also preferred for allocation flexibility where the multiplexing of multiple users on the same channel resources can be dynamic. For example, as shown in FIG. 6, portion of the channel resources, known as Resource Blocks (RB) in 3GPP LTE wireless communication system, are shared between client terminals A and B whereas another portion is shared between client terminals A and C and yet another portion may be used by client terminal A by itself, i.e., no MU-SM in that portion.

The number of possible MCSs used in 3GPP LTE wireless communication system may be high. For the client terminal to decode the complete payload information, it may need to know both the modulation type and coding scheme for the FEC decoding. On the other hand, for modulation symbol level decoding in an SM decoder, knowledge of only the modulation type is required. In most wireless communications systems, the number of modulation types is relatively smaller than the number of MCSs. However, after SM-MIMO decoding stage the data for the intended client terminal may be extracted and there is no need for the MCS of the other layer or codeword. Therefore, only requirement is that the SM-MIMO decoder be able to decode the signal intended for it without knowing the modulation type of the other layer or codeword.

In 3GPP LTE wireless communication system, the signal conditions may vary depending on the number of users, Signal to Interference and Noise Ratio (SINR) at different client terminals, the number and location of all the active client terminals, etc. It is desirable for the wireless communication network to be able to switch between non-SM, SU-SM and MU-SM modes without going through excessive signaling overhead. The 3GPP LTE wireless communication system provides a provision for such a dynamic allocation. Based on the provisions in the 3GPP LTE wireless communication system, in some scenarios the client terminal may be semi-statically configured to be MU-SM mode but may not be aware of whether there is actually another client terminal scheduled on the same resources at the same time. In conventional methods the decoding performance may be reduced for the case when the client terminal is in MU-SM mode but is unaware about the absence or presence of the scheduling of the other client terminal on the same resources at the same time. A method and apparatus are disclosed that enable improved decoding performance when the client terminal is unaware of absence or presence of the scheduling of the other client terminals when it is in MU-SM mode.

SUMMARY

In accordance with an aspect of the invention, a method for multi-user (MU) spatial multiplexing (SM) for a SM layer for which information of Modulation and Coding Scheme (MCS) is unavailable may include controlling, by a processing device, for each resource element (RE) of a resource block (RB) indicated in a wireless communication signal: SM decoding for each modulation type of a plurality of modulation types, in which the plurality of modulation types includes all possible modulation types of a wireless communication system, accumulating a distance metric for each of the plurality of modulation types according to the SM decoding, and incrementing a counter value corresponding to a first modulation type of the plurality of modulation types determined to be an optimum modulation type based on the accumulating. In addition, the method may include controlling, by the processing device, determining a second modulation type for the RB according to at least one of (i) a third modulation type of the plurality of modulation types determined to have a highest counter value or (ii) a fourth modulation type of the plurality of modulation types determined to have a lowest distance metric.

In one alternative, the plurality of modulation types may include a zero modulation type indicating absence of any other wireless communication device on a same set of channel resources at a same time.

In one alternative, the method may include controlling, by the processing device, second SM decoding for a second SM layer using a predetermined modulation type indicated by the information of MCS.

In one alternative, for each RE, the counter value may be of a counter corresponding to the first modulation type determined to be the optimum modulation type, the counter may be one of a plurality of counters respectively corresponding to the plurality of modulation types, and each of the plurality of counters may be initialized at zero at a start of the SM decoding of the RB.

In one alternative, the incrementing of the counter value may be by one.

In one alternative, the optimum modulation type may have a smallest distance metric.

In one alternative, the optimum modulation type may correspond to a zero modulation type of the plurality of modulation types indicating absence of any other wireless communication device on a same set of channel resources at a same time.

In one alternative, the smallest distance metric may be a cumulative Euclidean distance from the wireless communication signal.

In one alternative, the modulation types may be of a plurality of constellations of modulation types, and the method may further include, for each RE of the RB, storing in a memory, for each constellation of modulation types, a log likelihood ratio (LLR) indicating the distance metric corresponding to a fifth modulation type determined based on the accumulating to be the optimum modulation type for the constellation of modulation types.

In one alternative, the method may further include correcting a SM decoding decision for each RE of the RB according to the second modulation type for the RB.

In one alternative, the SM decoding for the SM layer for which the information of MCS is unavailable may be performed using a tree search algorithm before second SM decoding for a second SM layer is performed using a predetermined modulation type indicated by the information of MCS.

In accordance with an aspect of the present invention, an apparatus for multi-user (MU) spatial multiplexing (SM) for a SM layer for which information of Modulation and Coding Scheme (MCS) is unavailable may include circuitry configured to control, for each resource element (RE) of a resource block (RB) indicated in a wireless communication signal: SM decoding for each modulation type of a plurality of modulation types, in which the plurality of modulation types includes all possible modulation types of a wireless communication system, accumulating a distance metric for each of the plurality of modulation types according to the SM decoding, and incrementing a counter value corresponding to a first modulation type of the plurality of modulation types determined to be an optimum modulation type based on the accumulating. In addition, the circuitry may be configured to control determining a second modulation type for the RB according to at least one of (i) a third modulation type of the plurality of modulation types determined to have a highest counter value or (ii) a fourth modulation type of the plurality of modulation types determined to have a lowest distance metric.

In one alternative of the apparatus, the plurality of modulation types may include a zero modulation type indicating absence of any other wireless communication device on a same set of channel resources at a same time.

In one alternative of the apparatus, the optimum modulation type may have a smallest distance metric.

In one alternative of the apparatus, the modulation types may be of a plurality of constellations of modulation types, and the circuitry may be configured, for each RE of the RB, to store in a memory, for each constellation of modulation types, a log likelihood ratio (LLR) indicating the distance metric corresponding to a fifth modulation type determined based on the accumulating to be the optimum modulation type for the constellation of modulation types.

In one alternative of the apparatus, the SM decoding for the SM layer for which the information of MCS is unavailable may be performed using a tree search algorithm before second SM decoding for a second SM layer is performed using a predetermined modulation type indicated by the information of MCS.

In accordance with an aspect of the present invention, a wireless communication device for multi-user (MU) spatial multiplexing (SM) for a SM layer for which information of Modulation and Coding Scheme (MCS) is unavailable may include a receiver to receive a wireless communication signal. In addition, the wireless communication device may include a processing device configured to control, for each resource element (RE) of a resource block (RB) indicated in the wireless communication signal: SM decoding for each modulation type of a plurality of modulation types, in which the plurality of modulation types includes all possible modulation types of a wireless communication system, accumulating a distance metric for each of the plurality of modulation types according to the SM decoding, and incrementing a counter value corresponding to a first modulation type of the plurality of modulation types determined to be an optimum modulation type based on the accumulating. In addition, the processing device may be configured to control determining a second modulation type for the RB according to at least one of (i) a third modulation type of the plurality of modulation types determined to have a highest counter value or (ii) a fourth modulation type of the plurality of modulation types determined to have a lowest distance metric.

In one alternative of the wireless communication device, the plurality of modulation types may include a zero modulation type indicating absence of any other wireless communication device on a same set of channel resources at a same time.

In one alternative of the wireless communication device, the optimum modulation type may have a smallest distance metric.

In one alternative of the wireless communication device, the modulation types may be of a plurality of constellations of modulation types, and the processing device may be configured, for each RE of the RB, to store in a memory, for each constellation of modulation types, a log likelihood ratio (LLR) indicating the distance metric corresponding to a fifth modulation type determined based on the accumulating to be the optimum modulation type for the constellation of modulation types.

In one alternative of the wireless communication device, the SM decoding for the SM layer for which the information of MCS is unavailable may be performed using a tree search algorithm before second SM decoding for a second SM layer is performed using a predetermined modulation type indicated by the information of MCS.

DETAILED DESCRIPTION

The foregoing aspects, features and advantages of the present invention will be further appreciated when considered with reference to the following description of preferred embodiments and accompanying drawings, wherein like reference numerals represent like elements. In describing the preferred embodiments of the invention illustrated in the appended drawings, specific terminology will be used for the sake of clarity. However, the invention is not intended to be limited to the specific terms used.

Figure 7:
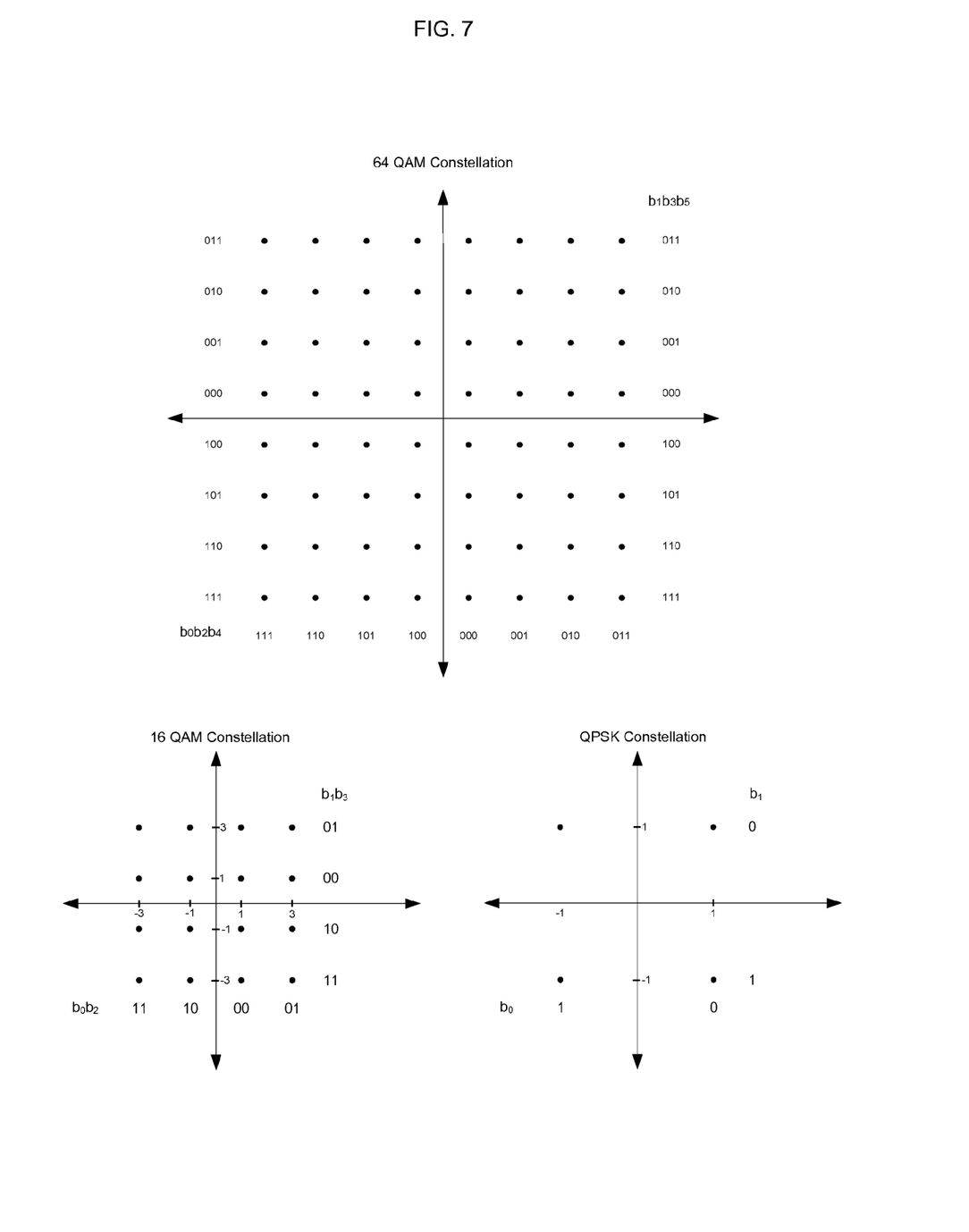
FIG. 7 illustrates the QPSK, 16-QAM and 64-QAM constellations used in 3GPP LTE wireless communication systems.
Figure 8:
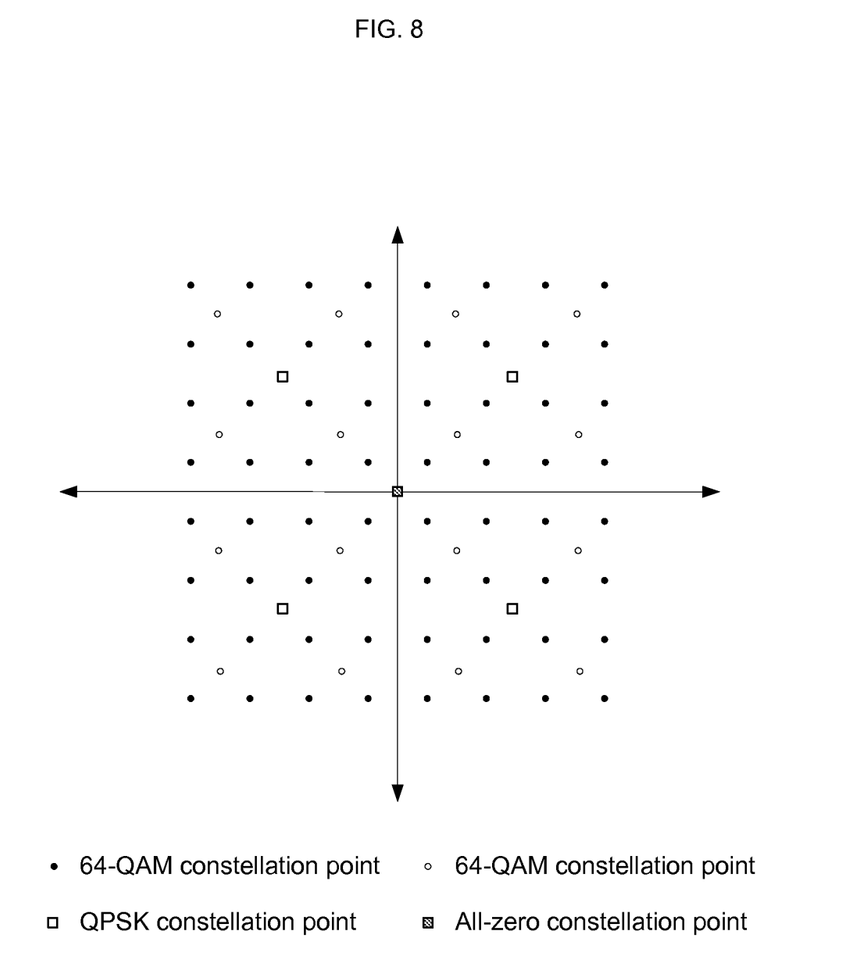
FIG. 8 illustrates a super constellation consisting of union of all possible constellations used in a communication system according to the aspects of the present invention.

According to an aspect of the present invention, when the client terminal is in MU-SM mode and is unaware of the absence or presence of scheduling of another client terminal on the same resources at the same time, it performs the MU-SM decoding by blindly determining the type of modulation used on the other layers. According to the aspects of the present invention the MU-SM decoding, without the information about the modulation type or MCS used by the other client terminal which may or may not be co-scheduled, is accomplished by first constructing a super constellation that consists of the modulation points from all possible modulation types that may be employed in a wireless communication system. For example, in case of 3GPP LTE-Advanced wireless communication system, the super constellation may use the base constellations QPSK, 16-QAM and 64-QAM as shown in FIG. 7 to form a super constellation as shown in FIG. 8. According to another aspect of the present invention, the super constellation may include an all zero point at the origin to handle the case of absence of any other client terminals on the same set of channel resources at the same time.

The client terminal may use any one of the well known conventional techniques for SM decoder, such as sphere decoder, K-best decoder, QR-Decomposition with M-algorithm (QRDM), or Maximum Likelihood (ML) decoder in combination with the aspects of the present invention. According to the aspects of the present invention, the conventional SM decoder methods are applied to the two SM layers using the known modulation type for the layer for which the network provides the MCS information and use the super constellation illustrated in FIG. 8 for the layer for which there is no MCS information available.

Figure 9:
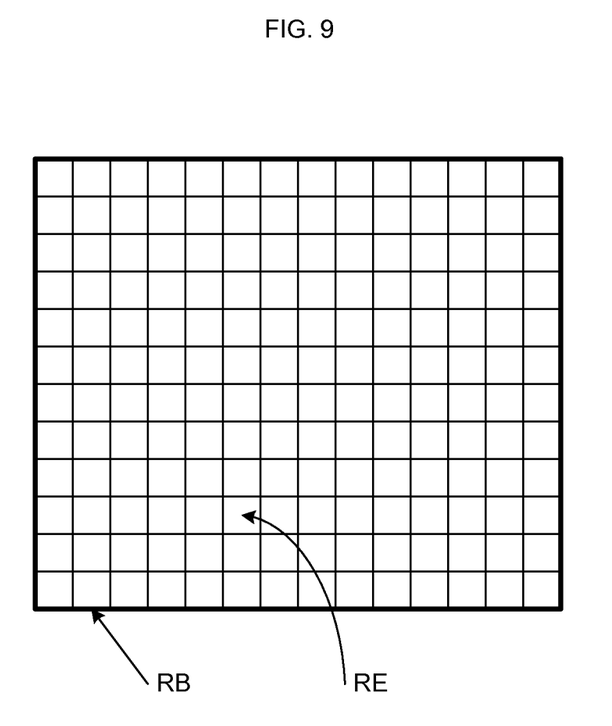
FIG. 9 illustrates a Resource Block and a Resource Element in a 3GPP LTE wireless communication system.

The multiplexing of multiple users on the same channel resources may vary dynamically. For example, in case of 3GPP LTE wireless communication system, the multiplexing may change on a per RB basis as shown in FIG. 6. Therefore the absence or presence of co-scheduled client terminals and, if present, the modulation type for the layer for which MCS information is not available may change from one RB to the next. In 3GPP LTE wireless communication system, a single RB may consist of a number of Resource Elements (REs) as shown in FIG. 9. The SM decoding is required for every single RE in every allocated RB. According to an aspect of the present invention, after performing the SM decoding using the super constellation for the layer for which the MCS information is not available, the decoded modulation type is determined using the decoded constellation point from the super constellation. In this manner, the modulation type is determined for every RE in the allocated RB. According to an aspect of the present invention, separate counters are maintained for each possible modulation type. These counters are initialized to zero at the beginning of decoding of each RB. For each RE decoding, based on the modulation type determined from the decoded constellation point, the counter corresponding to that modulation type is incremented by one. At the end of the SM decoding of an RB, the modulation type corresponding to the highest counter value is determined to be the modulation type used for that entire RB for the layer for which the MCS information is not provided by the network. According to an aspect of the present invention, the determined modulation type may include, based on the all-zero constellation point, the absence of a co-scheduled client terminal.

According to an aspect of the present invention, the SM decoder provides an optimum constellation point for each of the individual modulation types for each RE. Specifically, the optimum decoded constellation point within the QPSK constellation subset from the super constellation, the optimum decoded constellation point within the 16-QAM constellation subset from the super constellation, and the optimum decoded constellation point within the 64-QAM constellation subset from the super constellation are determined. According to an aspect of the present invention, for each of the optimum constellation point for each RE, the SM decoding metric such as the cumulative Euclidean distance from the received signal may be saved. According to an aspect of the present invention, for each of the optimum constellation point for each RE, the SM decoding metric such as the Log Likelihood Ratio (LLR) for the received signal may be saved. According to an aspect of the present invention, the SM decoding metric for each of the modulation type for each RE in an RB may be accumulated to form a single decoding metric for the entire RB for each modulation type. According to an aspect of the present invention, the modulation type corresponding to the lowest decoding metric (distance) may be determined to be the modulation type used for the entire RB for the layer for which the MCS information is not available. According to an aspect of the invention the distance metrics are also computed and maintained for the case of all-zero constellation point corresponding to the case of absence of co-scheduled client terminals and the lowest accumulated distance metric may correspond to an all-zero constellation point. This may be used as an indication of absence of other co-scheduled client terminals on the same resources at the same time.

According to an aspect of the present invention, once the absence or presence of co-scheduled client terminals and modulation type are determined for the given RB, the global optimum decoding decision for each of the REs in the RB are corrected by selecting the optimum constellation point for the modulation type determined for the entire RB for the layer for which the MCS information is not available from the wireless communication network. This improves the decoding performance as the SM decoding metric may correspond to different modulation type when processing different REs of an RB before the modulation type for the entire RB is determined.

Some conventional SM decoders such as Sphere decoder or K-best decoder may use tree search algorithms. According to an aspect of the present invention, the tree search first starts with the layer for which the modulation type is not known. This reduces the number of combinations that must be considered in the subsequent stages of the tree search algorithms.

Figure 10:
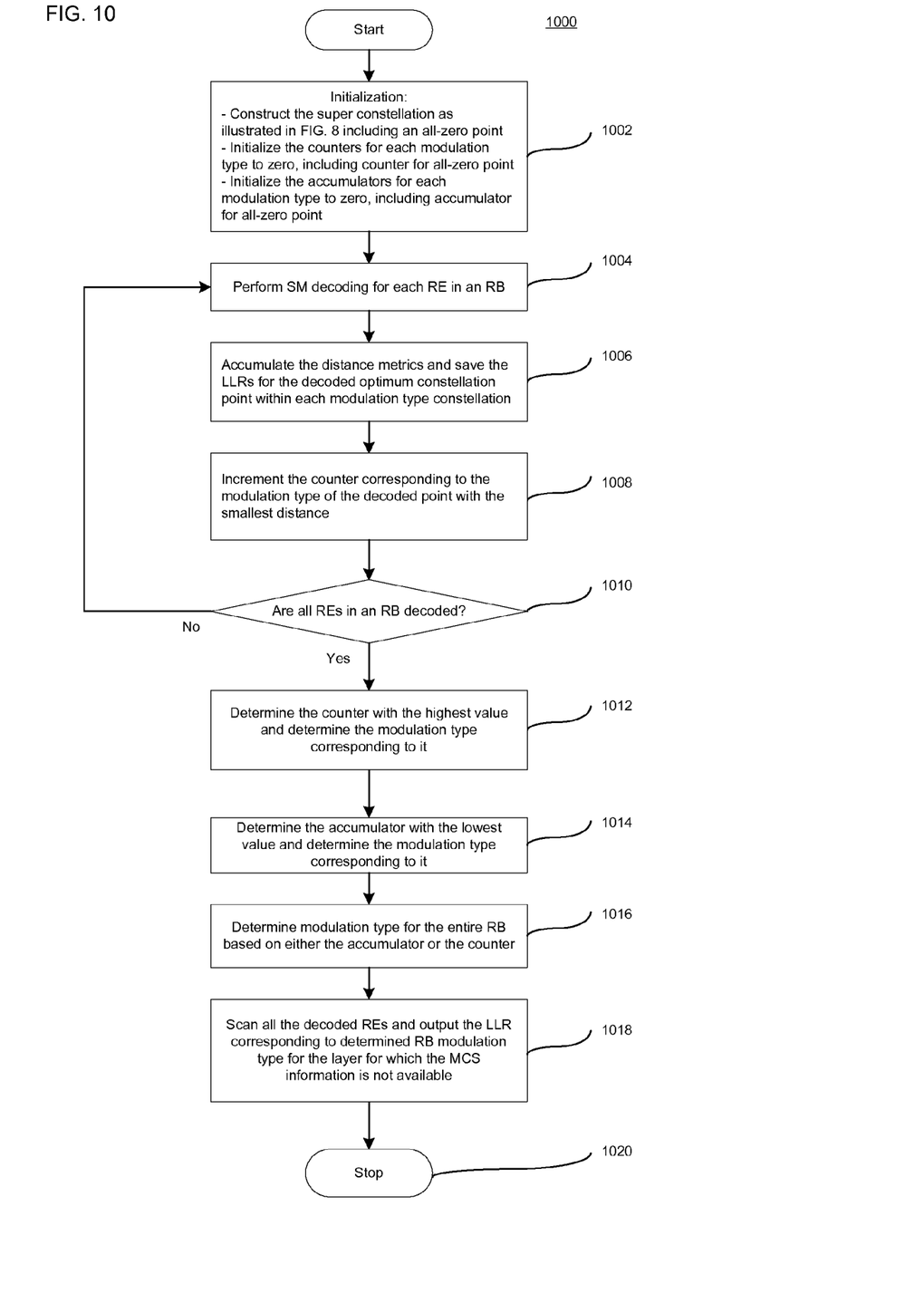
FIG. 10 illustrates the flow diagram for the processing steps according to aspects of the present invention.

The flow diagram 1000 contained in FIG. 10 illustrates the MU-SM decoding method according to the aspects of the present invention. The processing relevant to the present invention begins at processing stage 1002 where the super constellation as illustrated in FIG. 8 including an all-zero point is created, the counters for each modulation type are initialized to zero, including counter for all-zero point, and the accumulators for each modulation type are initialized to zero, including accumulator for all-zero point. At processing stage 1004, the SM decoding for an RE is performed. According to the aspect of the present invention, the SM decoder outputs the distance metrics and LLRs for the optimum constellation point within the subset of each modulation type from the super constellation. At processing stage 1006, the distance metrics are accumulated for each modulation type and the LLRs for the decoded optimum constellation point within each modulation type constellation are saved. At processing stage 1008 the counter corresponding to the modulation type of the decoded point with the smallest distance is incremented. At processing stage 1008, determination is made whether all REs in an RB are decoded. If all REs in an RB are not yet decoded, the processing returns to stage 1004. If all REs in an RB are decoded, processing continues at stage 1012. At processing stage 1012, the counter with the highest value is determined and from that the modulation type associated with it is determined. At processing stage 1014, the accumulator with the lowest value is determined and from that the modulation type associated with it is determined. At processing stage 1016 modulation type for the entire RB is selected based on the determination made in either processing stage 1012 or 1014. The particular method is based on selection between the two different implementation alternatives disclosed herein. The selection between the two methods may be based on performance versus implementation complexity tradeoff. The counter based method offers lower complexity and the accumulated distance metrics based method offers improved performance at slightly increased complexity. According to an aspect of the present invention metrics for only either one of these two methods may be computed and used for determining the absence or presence of co-scheduled client terminals and, if present, the modulation type of an RB. The selection between the two methods may be an implementation choice. At processing stage 1018, all the decoded RE results are scanned and the LLR corresponding to determined RB modulation type are output for the layer for which the MCS information is not available. The output LLRs may be used by an FEC decoder. The MU-SM decoding terminates at stage 1020.

By way of example only, the above-described method may be implemented in a receiver, e.g., a user device such as a wireless mobile station (MS) 12 as shown in FIG. 1.

Figure 11:
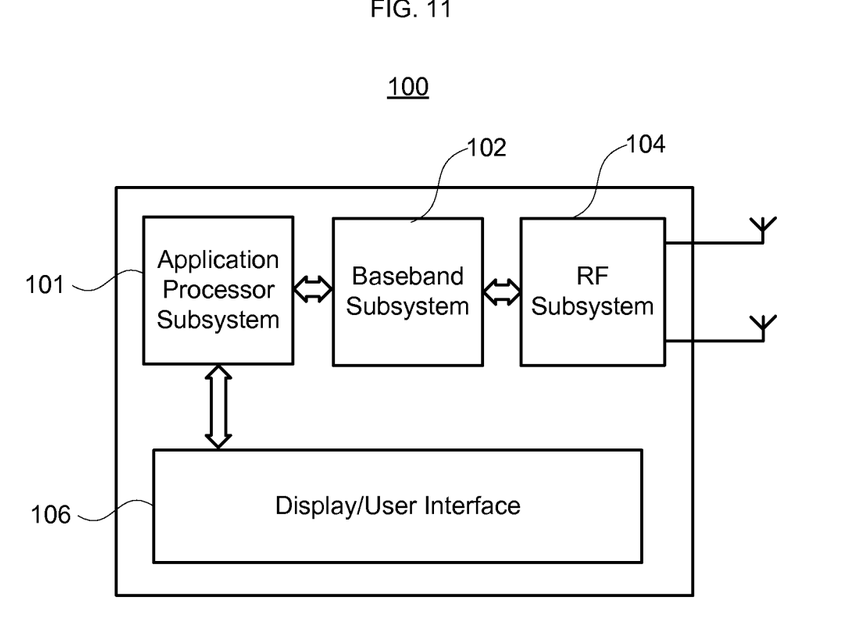
FIG. 11 illustrates a wireless mobile station diagram, which may be employed with aspects of the invention described herein.

As shown in FIG. 11, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 12:
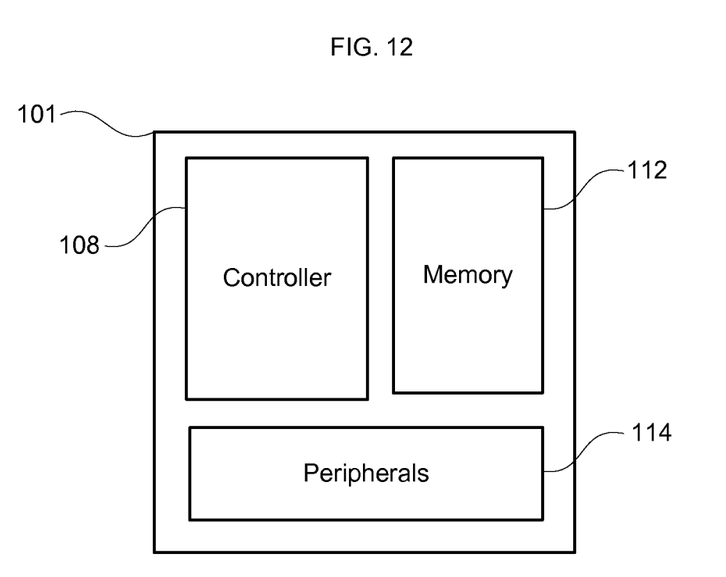
FIG. 12 illustrates an application processor subsystem for a wireless mobile station, which may be employed with aspects of the invention described herein.
Figure 13:
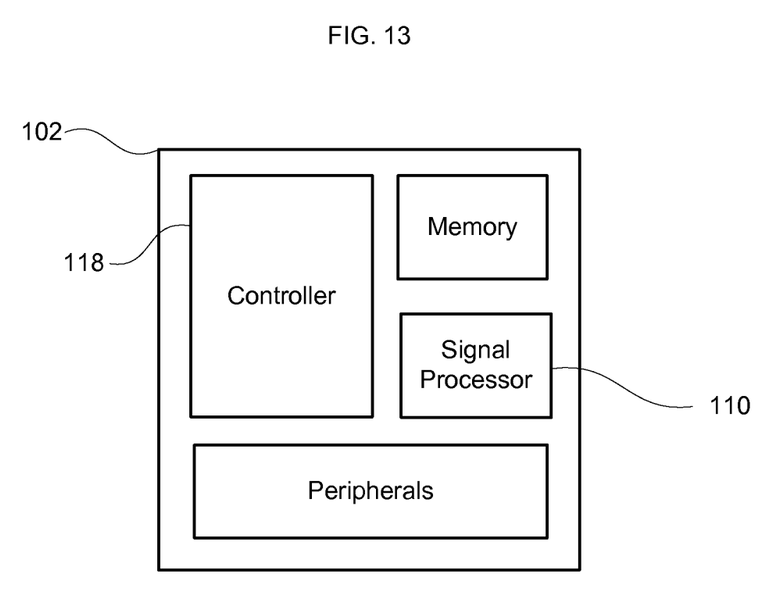
FIG. 13 illustrates a baseband subsystem for a wireless mobile station, which may be employed with aspects of the invention described herein.
Figure 14:
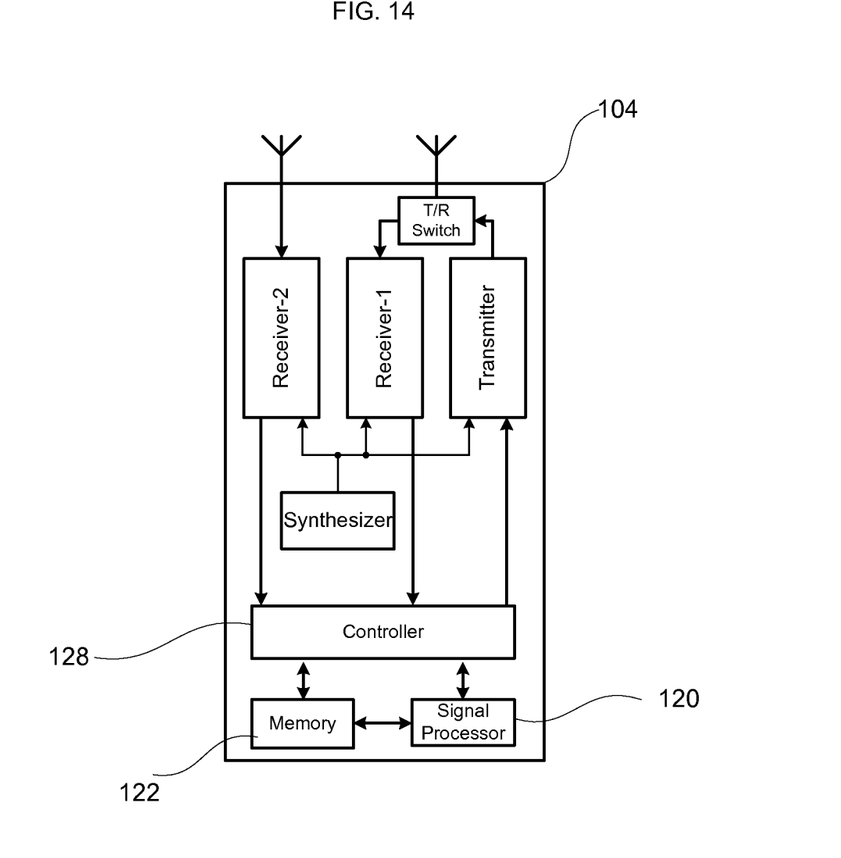
FIG. 14 illustrates an RF subsystem for a wireless mobile station, which may be employed with aspects of the invention described herein.

The application processor subsystem 101 as shown in FIG. 12 may include a controller 108 such as a microcontroller, another processor or other circuitry. The baseband subsystem 102 as shown in FIG. 13 may include a controller 118 such as a microcontroller or other processor. The RF subsystem 104 as shown in FIG. 14 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 13 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

In accordance with such aspects of the present invention, the MU-SM decoding method in the absence of information about the co-scheduled client terminals may be applied to various wireless communication systems such as systems based on an IEEE 802.16 wireless communication standard, an IEEE 802.11 wireless communication standard, an IEEE 802.20 wireless communication standard, or LTE-Advanced, a 3GPP wireless communication standard.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for multi-user (MU) spatial multiplexing (SM) for a SM layer for which information of Modulation and Coding Scheme (MCS) is unavailable, the method comprising:
   controlling, by a processing device, for each resource element (RE) of a plurality of REs of a resource block (RB) indicated in a wireless communication signal:
   SM decoding for each modulation type of a plurality of modulation types, in which the plurality of modulation types includes all possible modulation types of a wireless communication system,
   accumulating a distance metric for each of the plurality of modulation types according to the SM decoding, and
   incrementing a counter value for a first modulation type of the plurality of modulation types determined to be an optimum modulation type based on the accumulating; and
   controlling, by the processing device, determining a second modulation type for the RB according to at least one of (i) a third modulation type of the plurality of modulation types determined to have a highest counter value or (ii) a fourth modulation type of the plurality of modulation types determined to have a lowest distance metric.

2. The method of claim 1, wherein the plurality of modulation types includes a zero modulation type indicating absence of any other wireless communication device on a same set of channel resources at a same time.

3. The method of claim 1, further comprising:
   controlling, by the processing device, second SM decoding for a second SM layer using a predetermined modulation type indicated by the information of MCS.

4. The method of claim 1,
   wherein, for each RE, the counter value is of a counter for the first modulation type determined to be the optimum modulation type, wherein the counter is one of a plurality of counters respectively for the plurality of modulation types, and
   wherein each of the plurality of counters is initialized at zero at a start of the SM decoding of the RB.

5. The method of claim 1, wherein the incrementing of the counter value is by one.

6. The method of claim 1, wherein the optimum modulation type has a smallest distance metric.

7. The method of claim 6, wherein the optimum modulation type corresponds to a zero modulation type of the plurality of modulation types indicating absence of any other wireless communication device on a same set of channel resources at a same time.

8. The method of claim 6, wherein the smallest distance metric is cumulative Euclidean distance from the wireless communication signal.

9. The method of claim 1,
wherein the plurality of modulation types are of a plurality of constellations of modulation types and the method further comprises:
for each RE of the RB, storing in a memory, for each constellation of modulation types, a log likelihood ratio (LLR) indicating the distance metric corresponding to a fifth modulation type determined based on the accumulating to be the optimum modulation type for the constellation of modulation types.

10. The method of claim 1 further comprising:
correcting a SM decoding decision for each RE of the RB according to the second modulation type for the RB.

11. The method of claim 1, wherein the SM decoding for the SM layer for which the information of MCS is unavailable is performed using a tree search algorithm before second SM decoding for a second SM layer is performed using a predetermined modulation type indicated by the information of MCS.

12. An apparatus for multi-user (MU) spatial multiplexing (SM) for a SM layer for which information of Modulation and Coding Scheme (MCS) is unavailable, the apparatus comprising:
circuitry configured to control, for each resource element (RE) of a plurality of REs of a resource block (RB) indicated in a wireless communication signal:
SM decoding for each modulation type of a plurality of modulation types, in which the plurality of modulation types includes all possible modulation types of a wireless communication system,
accumulating a distance metric for each of the plurality of modulation types according to the SM decoding, and
incrementing a counter value for a first modulation type of the plurality of modulation types determined to be an optimum modulation type based on the accumulating; and
wherein the circuitry is configured to control determining a second modulation type for the RB according to at least one of (i) a third modulation type of the plurality of modulation types determined to have a highest counter value or (ii) a fourth modulation type of the plurality of modulation types determined to have a lowest distance metric.

13. The apparatus of claim 12, wherein the plurality of modulation types includes a zero modulation type indicating absence of any other wireless communication device on a same set of channel resources at a same time.

14. The apparatus of claim 12, wherein the optimum modulation type has a smallest distance metric.

15. The apparatus of claim 12,
wherein the plurality of modulation types are of a plurality of constellations of modulation types, and
wherein the circuitry is configured, for each RE of the RB, to store in a memory, for each constellation of modulation types, a log likelihood ratio (LLR) indicating the distance metric corresponding to a fifth modulation type determined based on the accumulating to be the optimum modulation type for the constellation of modulation types.

16. The apparatus of claim 12, wherein the SM decoding for the SM layer for which the information of MCS is unavailable is performed using a tree search algorithm before second SM decoding for a second SM layer is performed using a predetermined modulation type indicated by the information of MCS.

17. A wireless communication device for multi-user (MU) spatial multiplexing (SM) for a SM layer for which information of Modulation and Coding Scheme (MCS) is unavailable, the wireless communication device comprising:
a receiver to receive a wireless communication signal; and
a processing device configured to control, for each resource element (RE) of a plurality of REs of a resource block (RB) indicated in the wireless communication signal:
SM decoding for each modulation type of a plurality of modulation types, in which the plurality of modulation types includes all possible modulation types of a wireless communication system,
accumulating a distance metric for each of the plurality of modulation types according to the SM decoding, and
incrementing a counter value for a first modulation type of the plurality of modulation types determined to be an optimum modulation type based on the accumulating; and
wherein the processing device is configured to control determining a second modulation type for the RB according to at least one of (i) a third modulation type of the plurality of modulation types determined to have a highest counter value or (ii) a fourth modulation type of the plurality of modulation types determined to have a lowest distance metric.

18. The wireless communication device of claim 17, wherein the plurality of modulation types includes a zero modulation type indicating absence of any other wireless communication device on a same set of channel resources at a same time.

19. The wireless communication device of claim 17, wherein the optimum modulation type has a smallest distance metric.

20. The wireless communication device of claim 17,
wherein the plurality of modulation types are of a plurality of constellations of modulation types, and
wherein the processing device is configured, for each RE of the RB, to store in a memory, for each constellation of modulation types, a log likelihood ratio (LLR) indicating the distance metric corresponding to a fifth modulation type determined based on the accumulating to be the optimum modulation type for the constellation of modulation types.

21. The wireless communication device of claim 17, wherein the SM decoding for the SM layer for which the information of MCS is unavailable is performed using a tree search algorithm before second SM decoding for a second SM layer is performed using a predetermined modulation type indicated by the information of MCS.

* * * * *